United States Patent [19] | [11] 3,735,053
Eibensteiner | [45] May 22, 1973

[54] RECORDING AND/OR PLAYBACK APPARATUS WITH TAPE ENGAGEMENT MEANS RESILIENTLY URGED TO AN OPERATING POSITION

[75] Inventor: Walter Eibensteiner, Vienna, Austria

[73] Assignee: U.S. Philips Corporation, New York, N.Y.

[22] Filed: Nov. 3, 1971

[21] Appl. No.: 195,391

[30] Foreign Application Priority Data

Nov. 17, 1970 Austria..............................10329/70

[52] U.S. Cl. .....179/100.2 ZA, 179/100.2 T, 274/4 C
[51] Int. Cl...........................G11b 15/66, G11b 23/04
[58] Field of Search.................179/100.2 Z, 100.2 T, 179/100.2 MD, 100.2 ZA; 242/55.19 A; 274/4 C, 4 D; 226/49, 91

[56] References Cited

UNITED STATES PATENTS

| | | | |
|---|---|---|---|
| 3,643,038 | 5/1972 | Sato | 179/100.2 T |
| 3,665,120 | 5/1972 | Larkin | 179/100.2 T |
| 3,660,614 | 5/1972 | Swain | 179/100.2 Z |
| 3,647,984 | 3/1972 | Watanabe | 179/100.2 Z |
| 3,665,114 | 5/1972 | Hathaway | 179/100.2 T |
| 3,512,694 | 5/1970 | Sugaya et al. | 179/100.2 T |

*Primary Examiner*—Bernard Konick
*Assistant Examiner*—Alfred H. Eddleman
*Attorney*—Frank R. Trifari

[57] ABSTRACT

A recording and/or playback apparatus for recording and playing signals having a wide frequency spectrum from a tape-shaped record carrier such as video tape. The apparatus has a cylindrical drum about which the tape is to be wound for the recording and playing operation. A guide pin support member is arranged for pivotal movement about the drum between a first and second operating position and is provided with at least one guide pin for engaging the tape in the first operating position and when the guide pin support is pivoted to the second operating position the guide pin will engage the tape and wrap it about the cylindrical drum in a helical path. A stop member is mounted on the apparatus so as to define the second operating position and the guide pin support has a projection which will engage the stop member when the second operating position has been reached. A shifting device is provided to pivot the guide pin support between the operating positions and includes two pull members connected to the guide pin support, one of the pull members arranged for moving the guide pin support from the first to the second operating position and the other pull member arranged for moving the guide pin support from the second back to the first operating position. A motor is provided having reversible direction for driving the pull members. The pull member arranged for moving the guide pin support from the first to the second operating position is provided with a resilient element such as a spring so that when the pull member moves the guide pin support to the second operating position it will be resiliently urged against the stop member. Manually operable switch means are provided for initiating operation of the motor and additional switches are provided for turning off the motor when the guide pin support has reached either of its operating positions. The switch for turning off the motor when the guide pin support is moved to the second operating position is arranged so as to turn off the motor after the guide pin support has already reached the second operating position so that the support will be resiliently urged against the stop. Position retaining means are also provided so as to hold the guide pin support in either of its operating positions.

4 Claims, 5 Drawing Figures

PATENTED MAY 22 1973

3,735,053

Figure 1:
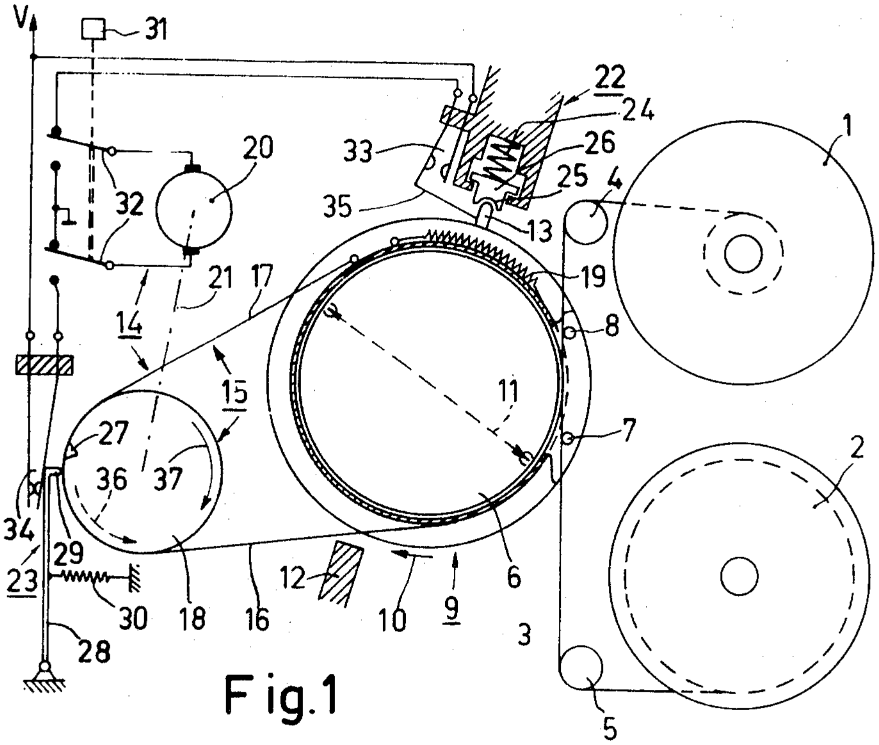

INVENTOR.
WALTER EIBENSTEINER
BY
Frank R. [signature]
Agent

INVENTOR.
WALTER EIBENSTEINER
BY
Agent

INVENTOR.
WALTER EIBENSTEINER
BY
Agent

RECORDING AND/OR PLAYBACK APPARATUS WITH TAPE ENGAGEMENT MEANS RESILIENTLY URGED TO AN OPERATING POSITION

The invention relates to a recording and/or playback apparatus, in particular for signals having a wide frequency spectrum. The apparatus has a guide pin support which is pivotable between two operating positions by means of a shifting device. The support carries at least one guide pin by means of which a tape-shaped record carrier can be engaged when the support is in the first operating position. When the support to the second operating position the tape can be looped along a helical path around the cylindrical surface of a drum. The guide pin support is held in both operating positions by positioning means. In such an apparatus it has already been suggested to use as a shifting device for pivoting the guide pin support in one direction, namely the direction from the first to the second operating position, a friction wheel gear which co-operates with the support and which is driven by a motor, whereas the pivotal movement in the reverse direction is effected by the stress produced in the record carrier during rewinding. This stress is transmitted to the guide pin support by means of the guide pin. Hitherto the positioning device for holding the said support in its two operating positions has been in the form of a locking device acting directly on the support.

It is an object of the invention to provide in an apparatus of the above-mentioned type an absolutely reliable and yet constructionally simple shifting device and corresponding positioning means. The invention is characterized in that at least to define the second operating position a stop for the guide pin support is provided, and that the shifting device includes a pull device which is arranged to be driven by a motor with reversible direction of rotation. The pull device operates to pivot the guide pin support in either direction by one of two pull members. The pull member for pivoting the guide pin support to the second operating position is connected to the support by a resilient element. A manually operable switch is provided for switching on the respective direction of rotation. Two further switches, each associated with one of the two operating positions of the said support, are arranged to switch off the motor, the switch associated with that operating position of the guide pin support to which same is pivoted by means of a resilient element switching off the motor only after this operating position has been reached, after the said support has been pivoted the positioning means hold the shifting device in the position which it occupies when the motor is switched off. Thus the guide pin support is positively moved in either of the operating positions by the shifting device and, at least in the second operating position, is always held under spring action in engagement with the stop which defines this operating position, the positioning means not holding the guide pin support itself but rather its shifting device. In this manner this support is securely held in its second operating position but is capable of yielding within certain limits to excessively large forces acting on it in a direction opposite to the respective shifting direction, but is immediately returned to the correct operating position on removal of these forces. This ensures that the guide pin support cannot be thrown uncontrolledly and permanently out of the second operating position neither can it be damaged which would occur if it should have been held in this position too firmly. Furthermore the second operating position is positively defined by the stop and not by the distance through which the shifting device moves, but on the contrary this device is designed for travelling through a distance which is greater than is absolutely necessary, so that it is of simple and uncritical design.

It has been found that for a simple structure it is highly advantageous that for operating one of the further switches, which is associated with the operating position of the guide pin support to which same is pivoted by means of a resilient element, a switch arm is provided which co-operates with a control disc which is arranged to be driven by the motor simultaneously with a drive for the pull device, said switch arm, on operating of the switch snaps into a recess in the control disc and holds the pull device through said drive.

Advantageously a self-locking transmission gear is provided for driving the pull device, such a gear will also form a holding means for the pull device.

Figure 2:
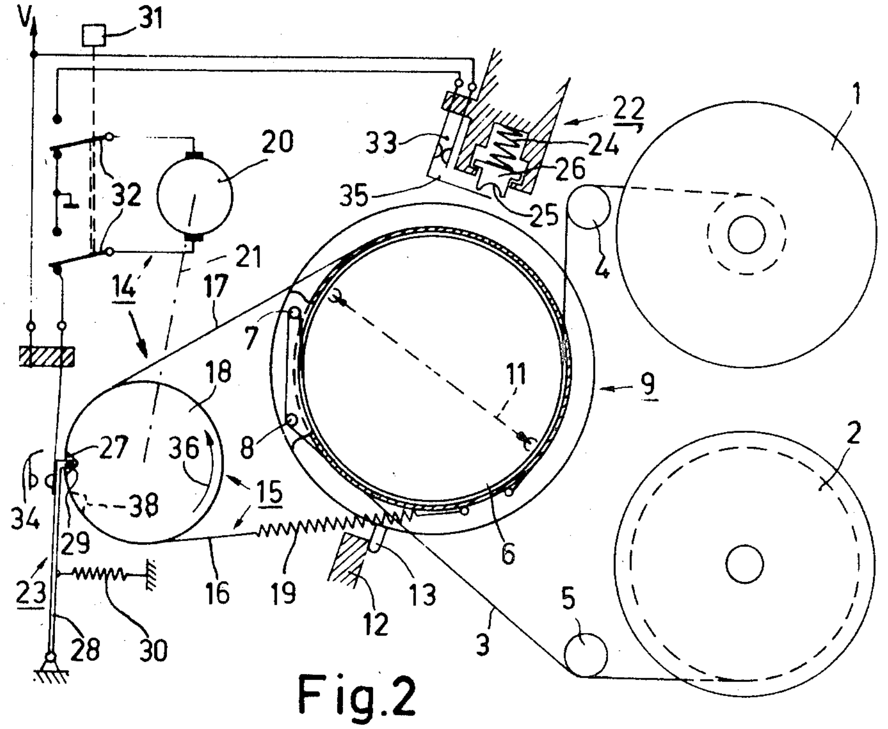
Figure 3:
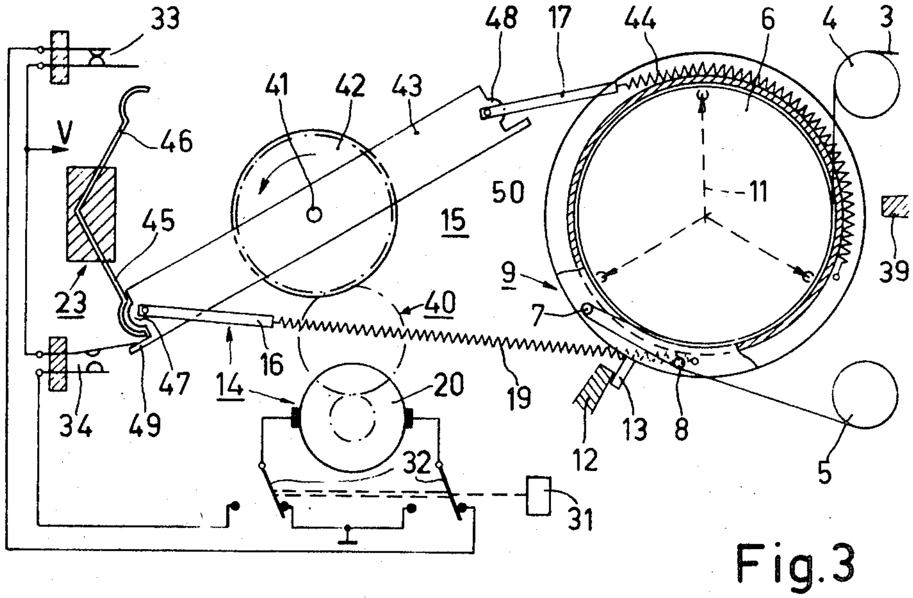
Figure 4:
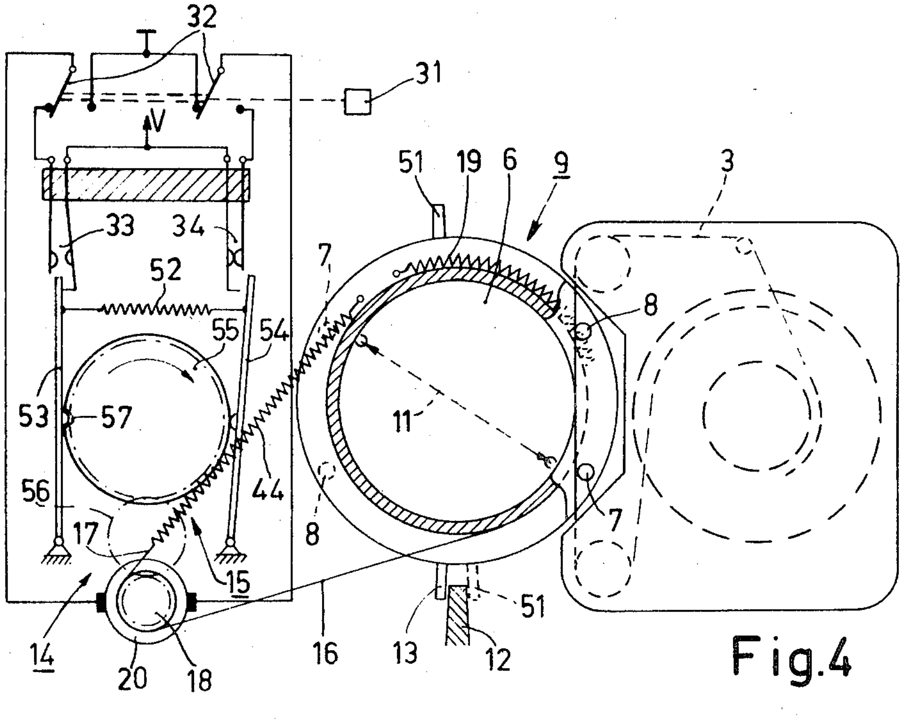
Figure 5:
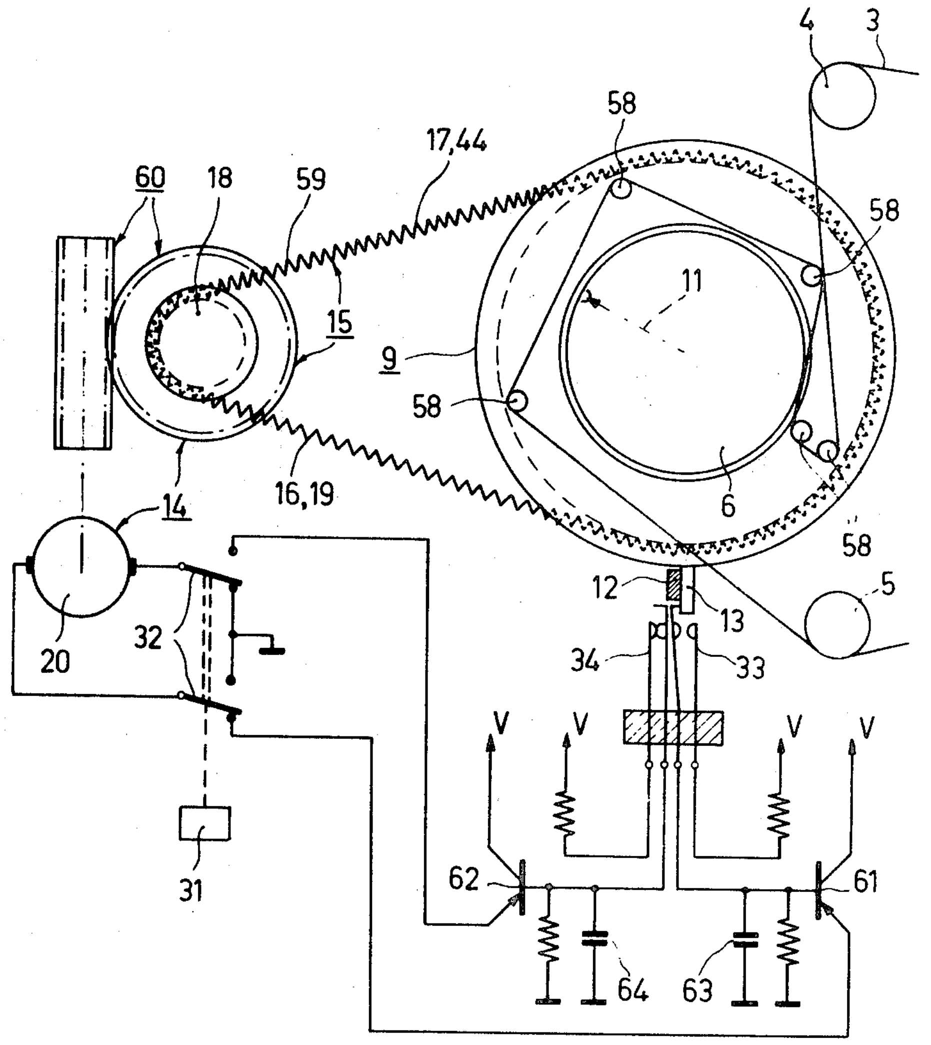

Embodiments of the invention will now be described, by way of non-limitative example, with reference to the accompanying diagrammatic drawings, in which:

FIG. 1 shows, in a first embodiment, a guide pin support in a first operating position together with a device for shifting the said support to a second operating position, FIG. 2 shows the guide pin support of FIG. 1 in its second operating position, FIG. 3 shows in a second embodiment a guide pin support, also having two operating positions, together with a modified device for shifting said support between said operating positions, FIG. 4 shows in a third embodiment a guide pin support having also two operating positions, however together with another modified device for shifting said support between said operating positions, FIG. 5 shows in a further embodiment a guide pin support with two operating positions and with still another device for shifting said support between said operating positions.

Referring now to FIGs. 1 and 2, reference numerals 1 and 2 denote spools for a tape-shaped record carrier 3 which runs from one spool to the other via guide rollers 4 and 5. In the region between the rollers 4 and 5 the record carrier passes between a drum 6 and two guide pins 7 and 8. The guide pins 7 and 8 are mounted on an annular guide pin support 9 arranged to pivot about the drum 6. When this support is pivoted from its first operating position shown in FIG. 1 in the direction indicated by the arrow 10 into its second operating position shown in FIG. 2 it engages the record carrier by means of the guide pins 7 and 8 and loops it around the cylindrical surface of the drum 6 along a helical path. In the embodiment shown the record carrier is wound round the cylindrical surface through 180°, and in this range a rotating magnetic-head arrangement 11 co-operates with the record carrier for recording or playing back signals. In the second operating position of the guide pin support the record carrier extends from the guide roller 4 along the cylindrical surface via the guide pins 7 and 8 to the guide roller 5, which together with the spool 2 is arranged at a level higher than that of the roller 4 and the spool 1, the difference in height corresponding to the value of the pitch of the record carrier on the cylindrical surface of the drum 6. The second operating position of the guide pin support together with the positions of the guide roller 4 and the drum 6 determines the angle through which record carrier is wound round the cylindrical surface. The predetermined winding angle must always be exactly maintained each time when the record carrier is threaded into the apparatus to ensure that the magnetic-head arrangement scans the tracks on the record carrier along the predetermined length and in the predetermined sequence. Hence it is particularly important that the guide pin support should be accurately set to the second operating position.

According to the invention the second operating position is defined by a stop 12 for a projection 13 provided on the support 9. Provision is further made of a shifting device 14 which includes a pull device 15 which pivots the support 9 by means of two pull members 16 and 17. The pull device comprises a pulley 18 over the cylindrical surface of which runs a cord which forms the pull member 16 and 17. The pull member 16 is connected to the guide pin support 9 via a spring 19, but the free end of the pull member 17 is directly secured to the support. In order to ensure that the cord is driven by the pulley and to hold the cord to the pulley when the latter after being shifted is in either of its end positions, the cord may, depending upon the instantaneous conditions of friction, either run simply on the cylindrical surface of the pulley or be wound round it with a full turn. To drive the pulling device which pivots the support 9 in opposite directions a motor 20 with reversible direction of rotation is provided which is connected to the pulley 18 by a shaft 21.

The positioning means by which the guide pin support 9 is held in the two operating positions comprise for the first operating position a holding device 22 cooperating directly with the guide pin carrier and for the second operating position a latching device 23 acting on the shifting device 14. The holding device 22 comprising a bolt 26 which is movable in a guide against the action of a spring 24 and at its free end has a groove 25 formed in it into which the projection 13 on the guide pin support snaps when the support reaches the first operating position. The latching device 23 comprises a recess 27 in the circumference of the pulley 18 and a pivoting arm 28 which has a hooked end 29 which under the action of a spring 30 engages the circumference of the pulley 18 and when the hooked end 29 snaps into the recess 27 holds the pulley.

The motor 20 is controlled by means of a manually operable switch 32 — shown schematically by a button 31 — for switching on the respective direction of rotation and by means of further switches 33 and 34 for switching off, said switches 33 and 34 associated with one of the operating positions of the guide pin support. The switch 33 associated with the first operating position has a sensor 35 which extends into the area of the holding device 22 and opens the switch as soon as the projection 13 on the guide pin support snaps into the holding device 22. The switch 34 associated with the second operating position is actuated by the arm 28, by which it is opened when the hooked end 29 of the arm 28 snaps into the recess 27 in the pulley 18.

The operation of the shifting device 14 for the guide pin support 9 is as follows. In the first operating position shown in FIG. 1 the projection 13 of the support 9 is held by the holding device 22, so that the switch 33 is open and hence the circuit of the motor 20 is broken, because the switch 32 is in the position into which the last operation of the motor has rotated the pulley 18 in the direction indicated by an arrow 36. The switch 34 is closed, because the arm end 29 engages the circumference of the pulley 18; the pulley 18 is not held by the latching device 23.

If now a record carrier threaded between the drum 6 and the guide pins 7 and 8 is to be wound round the cylindrical surface of the drum 6, the button 31 is pushed. As a result the switch 32 is changed over, so that the circuit for the motor 20 is closed owing to the closed condition of the switch 34. The motor starts rotating the pulley in the direction indicated by an arrow 37, so that by way of the pull member 16 of the pull device the guide pin support 9 is released from the holding device 22 and is pivoted in the direction indicated by the arrow 10. During this pivotal movement the pin 7 engages the record carrier and loops it round the cylindrical surface until the projection 13 on the support 9 strikes the stop 12, which means that the second operating position of this support has been reached. At this instant the recess 27 in the pulley 18 has not yet reached the end 29 of the arm 28, its position at this moment being shown in broken lines at 38, so that the motor continues rotating the pulley. Since further rotation of the guide pin support is prevented by the stop 12, the spring 19 is stretched until the arm end 29 snaps into the recess 27, with the result that the switch 34 is opened and the motor circuit is broken and also the pulley 18 is held. In this situation the pulling device is held by the latching device 23 so that the spring 19 remains stretched and the switch remains open. Thus the support 9 is held in the second operating position in which the projection 13 engages the stop 12 under the action of the spring 19, as is shown in FIG. 2. In this second operating position the switch 33 corresponding to the first operating position is in the closed condition and hence the motor circuit is put in readiness for returning the guide pin support to the first operating position.

As will be clear from the drawings, the second operating position of the guide pin support is defined with complete accuracy by the stop 12. This support cannot accidentally be thrown out permanently of this operating position, because it will immediately be returned by the pull device when the forces which have lifted the projection from the stop 12 are removed. Such forces may occur by shock loads imposed by the record carrier during rewinding. The pull device itself is not required to travel an accurately defined distance, since any excess travel is absorbed by the spring 19.

Return of the guide pin support to the first operating position is initiated by moving the button 31 back to its initial position, so that the switch 32 returns to the position shown in FIG. 1. Since the switch 33 is in the closed condition, the circuit for the motor 20 is closed, causing the motor to run in the opposite direction of rotation, so that the pulley 18 is rotated in the direction indicated by the arrow 36. During this rotation the recess 27 moves out of the latching device 23, the spring 19 is relaxed by way of the pull member 16 and the guide pin support 9 is pivoted in the direction opposite to that indicated by the arrow 10 by means of the pull member 17, until the support is again held by the holding device 22, whereupon the motor circuit is broken again by the switch 33 being opened, and the shifting movement is terminated. Thus the pull device has returned the support 9 to the first operating position, enabling the record carrier to be manually removed or to be returned to the initial position shown in FIG. 1 by a winding operation.

In the embodiment shown in FIG. 3 also, a stop 12 is associated with the second operating position of the guide pin support 9 shown in this Figure. However, the first operating position also of this support 9 is defined by a stop 39. The reason for this construction is that it has been found to be advantageous when this first operating position also is always accurately maintained, because frequently the gap available for threading the record carrier between the drum and the guide pins 7 and 8 is comparatively narrow. A projection 13 is again provided which co-operates with the two stops 12 and 39. In this embodiment the stops are disposed so that in the second operative position of the stud support the record carrier is wound round the drum through 120°.

The shifting device 14 comprises a pull device 15 which is arranged to be driven through a gearing 40 by a motor 20 the direction of rotation of which is reversible again. The pull device comprises a lever 43 which is arranged to pivot about a pivot pin 41 and is coupled to a gear-wheel 42 of the gearing and the free ends of which are each hingedly connected to a rod, the two rods forming the two pull-members 16 and 17. In the embodiment shown the two pull members 16 and 17 are each connected to the guide pin support by a resilient member, the rod 16 by a spring 19 and the rod 17 by a spring 44.

The means for positioning the guide pin support act on the shifting device 14 in both operating positions and comprise a latching device 23 provided with two resilient arms 45 and 46 which are arranged in the shape of a V and each have a curved end into which may snap projections 47 and 48 respectively provided each at one end of the lever 43.

The motor is again controlled by a manually operable switch 32 for the respective direction of rotation and by two further switches 33 and 34 for switching out the motor, which are each associated with one of the operating positions of the guide pin support. The switches 33 and 34 are operated by switch arms 49 and 50 respectively provided each at one end of the lever 43, the operation of either switch taking place only after the respective operating position of the guide pin support has been reached, i.e. some time after the respective operating position has been reached. Otherwise this arrangement functions in the same manner as the aforedescribed embodiment. However, in respect of the two operating positions of the guide pin support the sequence of events now is that first the projection 13 strikes the stop 12 or 39, then the pull device is moved somewhat further in the respective direction or rotation by the motor, so that the spring 19 or 44 cooperating with the pull member 16 or 17 respectively is stretched, and finally the motor is switched off and the lever 43 is locked in the instantaneous position by the latching device 23.

FIG. 4 shows an embodiment in which the record carrier is accommodated in a cartridge. This record carrier is introduced between the drum 6 and the guide pins 7 and 8 of the guide pin support 9 in the first operating position thereof by placing the cartridge on the apparatus with a part of the record carrier extending across a cut-away portion of the cartridge. In the embodiment shown the drum 6 is secured to the guide pin support 9 and arranged for joint pivotal movement. FIG. 4 shows the first operating position of the guide pin support. As will readily been seen, in this embodiment also it is of particular importance that this first operating position of the guide pin support should be exactly correct to ensure that when the cartridge is placed on the apparatus, which may be automatically effected by means of an adjustable cartridge holder, the record carrier should be located in the threading position with certainty.

The pull device 15 again comprises a cord which consists of two parts and is wound around a pulley 18 of the motor 20. The part 16 is connected to the guide pin support 9 through a spring 19 and the part 17 through a spring 44. The support 9 has two projections 13 and 51 which together with a stop 12 define the two operating positions of the support, the record carrier being wrapped around the cylindrical surface of the drum through 180° in the second operating position. This second operating position is indicated in FIG. 4 by the guide pins 7 and 8 and the projection 51 shown in broken line.

The motor is again controlled by a switch 32 and further switches 33 and 34. The switches 33 and 34 are operated by switch arms 53 and 54 respectively, which are arranged to pivot against the action of a spring 52 and can be shifted by a control disc 55. This control disc is arranged to be driven, simultaneously with the pull device, by the motor 20 through a gear-wheel 56. The control disc is provided at its circumference with a recess 57 into which the switch arms 53 and 54 may snap. In snapped-in position an arm 53 and 54 opens the associated switch 33 or 34 respectively. As soon as a switch arm 53 or 54, snaps into the recess, it locks the control disc, so that through the gear-wheel 56 the pulley 18 and hence the entire pull device is held in the instantaneous position. Thus, the switch arms 53–54 together with the control disc and the gearing by which it is coupled to the motor form the means for positioning the pull device. By means of the shape of the control disc and of the choice of the gear ratio of the gearing through which it is driven by the motor the distance which the pull device travels, i.e. the degree of stretching of the springs 19 and 44 after the support 9 has reached either operating position by striking the stop 12, may simply be determined. Owing to the action of the spring elements 19 and 44 the guide pin support is then held in the respective operating position with the projection 13 or 51 in engagement with the stop 12.

In the embodiment shown in FIG. 5 the guide pin support 9 may be rotated around the drum 6 through 360°, and for wrapping the record carrier round the cylindrical surface of the drum through 360° it is provided with 5 guide pin 58. The two operating positions of the guide pin support, the second of which is shown in FIG. 5, are defined by a stop 12 which is engaged either on one side or on the other by a projection 13 on the guide pin support.

The pull device 15 of the device for shifting the guide pin support comprises a pulley 18 and an endless pull member 59 in the form of the helical spring which is looped around the pulley 18 and the guide pin support 9, in each of which it runs in a circumferential groove which may be conical and may have corrugations to increase the friction, to ensure a correspondingly tight coupling with these parts, preventing slipping of the pull device. The two parts of the helical spring between the pulley and the guide pin support constitute the two pull parts (16, 17) and also the spring elements (19, 44). The pulley 18 is driven by the motor 20 through a self-locking worm gearing 60, which simultaneously forms the positioning means for the shifting device 14, because owing to the self-locking action of the gearing the pulley 18 can no longer move after the motor has been switched off.

The motor is again controlled by means of a switch 32 and further switches 33 and 34, but in this embodiment the latter switches are operated by the projection 13 on the guide pin support. The switches 33 and 34, however, do not directly influence the motor circuit, but control switching transistors 61 and 62 which are connected in this circuit and the base circuits of which include charging capacitors 63 and 64, so that they switch off the motor with a time delay relative to the operation of the switches 33 and 34. This delay ensures that after the guide pin support has reached an operative position the pull device still is shifted by the motor for a short time, so that the spring portion of the pull part 16 or 17 is stretched. This again ensures that the guide pin support is held in engagement with the stop by spring action in both operating positions.

Alternatively, in this embodiment the pull part 59 may be in the form of a resilient belt, for example a rubber cord, provided care is taken to ensure that it does not slip on the pulley 18 or on the guide pin support 9, but this may readily be achieved by providing suitable frictional conditions.

I claim:

1. In a recording and/or playback apparatus for recording and playing signals having a wide frequency spectrum the combination comprising a cylindrically shaped drum mounted on said apparatus about which a tape-shaped record carrier arranged on the apparatus is to be helically wound for recording and playback operation, a guide pin support arranged for pivotal movement about said drum between first and second operating positions, at least one guide pin carried on said guide pin support for engaging said tape-shaped record carrier, said guide pin engaging said tape-shaped record carrier when said guide pin support is in said first operating position, a shifting device having means connected to said guide pin support for shifting said guide pin support between said first and second operating positions so that when said guide pin support is shifted from said first to said second operating positions said guide pin in engagement with said tape-shaped record carrier will be pivoted about said drum thereby wrapping said tape-shaped record carrier about said drum in a helical path, a stop member mounted on said apparatus for engagement by said guide pin support so as to define said second operating position, said shifting device comprising a pull device having first and second pull members extending between said pull device and said guide pin support for pivoting said guide pin support, a motor having a reversible direction of rotation connected to said pull device for driving same, one of said pull members arranged for pivoting said guide pin support from said first to said second operating positions when said motor drives the pull device in one direction, the other of said pull members arranged for pivoting said guide pin support from said second to said first operating positions when said motor drives the pull device in the other direction, a resilient element connecting said pull member for pivoting the guide pin support from the first to the second operating positions to the guide pin support, said resilient element resiliently urging said guide pin support against said stop member when said guide pin support is pivoted to the second operating position, position retaining means arranged for holding said guide pin support is said operating positions, manually operable switch means for initiating operation of said motor in either of its operating directions, a switch associated with each of said operating positions of said guide pin support for switching off said motor, switch-off means for operating said switch associated with said second operating position to switch-off said motor after said guide pin support has engaged said stop member, said motor continuing operation after said second operating position has been reached until said switch-off means operates said switch to turn off said motor, said guide pin support thereby being yieldably pressed against said stop member by said resilient element, said shifting device being held in the position it occupies after said guide pin support has been pivoted to one of its operating positions and said motor has been turned off by said position retaining means.

2. In the apparatus according to claim 1 wherein said switch-off means for operating the switch associated with said second operating position comprises a control disc rotatably driven by said motor simultaneously with the drive of said pull device, said control disc having a recess, and a switch arm having an end arranged for cooperation with said control disc snapping into said recess to operate said switch and turn off the motor when said disc has been rotated to a position corresponding to the second operating position of said guide pin support, said switch arm holding said pull device through said drive so that second operating position is retained.

3. In the apparatus according to claim 1 further comprising a self-locking transmission gear for driving said pull device.

4. In the apparatus according to claim 1 further comprising a second resilient element connecting said pull member for pivoting the guide pin support from said second to said first positions to said guide pin support, and a further stop member for defining said first operating position mounted on said apparatus, said guide pin support being resiliently urged against said further stop member by said second resilient element when said guide pin support is pivoted to said first operating position.

* * * * *